(12) United States Patent
Hardt

(10) Patent No.: US 6,824,324 B2
(45) Date of Patent: Nov. 30, 2004

(54) TECHNIQUE FOR PROVIDING A PIVOT STRUCTURE THAT FACILITATES THE RAPID FORMATION OF PIVOT COUPLINGS BETWEEN COMPONENTS

(75) Inventor: Thomas T. Hardt, Missouri City, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/022,003

(22) Filed: Dec. 14, 2001

(65) Prior Publication Data
US 2003/0113158 A1 Jun. 19, 2003

(51) Int. Cl.[7] .............................................. F16B 19/08
(52) U.S. Cl. ..................... 403/282; 403/279; 403/164; 403/408.1; 411/501; 29/525.06
(58) Field of Search ................................. 403/274, 278, 403/279, 282, 119, 164, 280, 281, 408.1; 411/500, 501, 502; 29/524.1, 525.06, 243.53

(56) References Cited

U.S. PATENT DOCUMENTS

| | | | | | |
|---|---|---|---|---|---|
| 2,096,598 | A | * | 10/1937 | Sheane | 29/524.1 X |
| 3,551,015 | A | * | 12/1970 | Whiteside et al. | 29/525.06 X |
| 4,177,545 | A | * | 12/1979 | Lambertz | 411/501 X |
| 4,221,041 | A | * | 9/1980 | Hufnagl et al. | 403/274 X |
| 4,878,795 | A | * | 11/1989 | Woodrow et al. | 411/501 |
| 5,009,557 | A | * | 4/1991 | Dessirier | 29/524.1 X |
| 5,738,475 | A | * | 4/1998 | Chaban | 411/501 |
| 5,868,535 | A | * | 2/1999 | Ladouceur | 411/501 X |
| 6,139,237 | A | * | 10/2000 | Nagayama | 411/501 X |

* cited by examiner

Primary Examiner—Daniel P. Stodola
Assistant Examiner—Ryan M. Flandro

(57) ABSTRACT

A system for pivotably coupling components. The system comprises a pivot structure having a head, a body, a deformable retention feature and a stop. The stop is positioned to limit movement of a cooperating deformation tool to ensure predictable pivot spacing.

19 Claims, 5 Drawing Sheets

TECHNIQUE FOR PROVIDING A PIVOT STRUCTURE THAT FACILITATES THE RAPID FORMATION OF PIVOT COUPLINGS BETWEEN COMPONENTS

FIELD OF THE INVENTION

The present invention relates generally to a technique for pivotably coupling adjacent components, and particularly to a structure and the use of that structure in rapidly forming repeatable pivot connections.

BACKGROUND OF THE INVENTION

Pivot connections are used in a wide variety of environments and in numerous electrical devices, such as computers, servers, etc. For example, numerous types of levers, covers, housing portions and other components are pivotably coupled to chassis of electrical devices or to components on or in such devices.

There are several existing mechanisms for pivotably coupling adjacent members. For example, shoulder screws have been used to couple one component to another. Shoulder screws, however, tend to be more complex to install. Typically the screw portion is inserted through openings formed in the adjacent components, and then an appropriate threaded fastener is rotated onto the threaded portion of the screw to pivotably secure the components.

A faster method for providing a pivot connection involves riveting one member to another. A rivet is extended through corresponding openings in adjacent members and then compressed to form the pivot joint. However, the compression of rivets is difficult to control and the resultant joint can create unwanted friction with respect to the pivoting motion or a joint that is undesirably loose.

Similarly, components have been staked together with extrusions formed on one of the members to be joined. The extrusion is extended through a corresponding opening and the extrusion is flattened to couple the adjacent components. Again, however, there is limited control over the degree to which the extrusion is flattened, resulting in joints that can be undesirably tight or loose. With staking, like riveting, this lack of control leads to unpredictability in the process.

SUMMARY OF THE INVENTION

The following passage is intended only to provide a brief summary of limited aspects of the present invention and should not be construed as encompassing all necessary elements or steps of the invention.

The present invention relates generally to a technique for pivotably coupling a first component to a second component. The technique utilizes a pivot structure having a head, a body connected to the head, a stop and a deformable retention portion. Typically, the body is inserted through the first component and the head is driven into the component to plastically deform a region that secures the head in place. Also, the second component is rotatably mounted to the body, and the retention portion is plastically deformed to secure the first member and the second member between the head and deformed retention portion.

Deformation of the retention portion is accomplished by an appropriately shaped tool, and the motion of this tool is limited by the stop. In other words, the tool is allowed to progress only to a predetermined degree in deforming the retention portion prior to abutting the stop. This allows the rapid formation of a pivot joint with a predetermined space between the head portion and the deformed retention member.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

It will be appreciated that the present invention can take many forms and embodiments. Some embodiments of the invention are described so as to give an understanding of the invention. It is not intended, however, that the embodiments of the present invention that are described in this specification should limit the invention.

Figure 1:
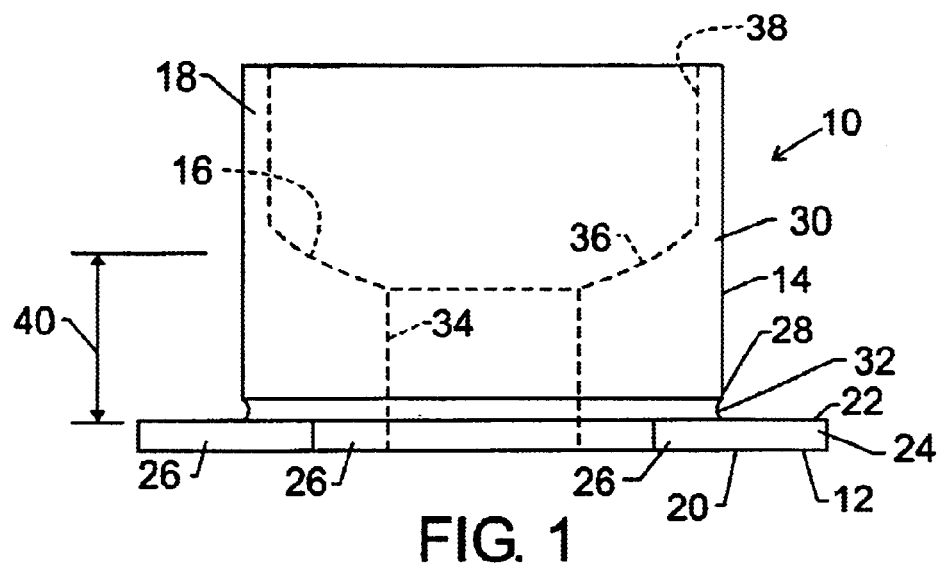
FIG. 1 is a front elevational view of an exemplary pivot structure according to one embodiment of the present invention.
Figure 2:
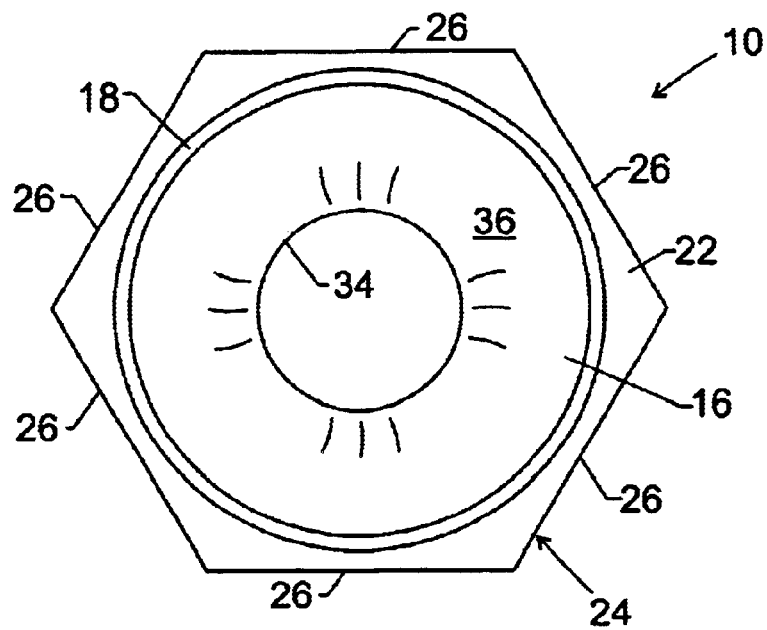
FIG. 2 is a top view of the pivot structure illustrated in FIG. 1.

Referring generally to FIGS. 1 and 2, a pivot structure 10 is illustrated according to one embodiment of the present invention. Pivot structure 10 comprises a head 12, a body 14, a stop 16 and a retention feature 18. The various components of pivot structure 10 may be formed of two or more individual pieces fastened together by, for example, welding. However, the overall pivot structure 10 typically is formed of a single, uniform material, such as a metal. In fact, one exemplary methodology for forming pivot structure 10 comprises cutting a conventional standoff to a desired height and removing a desired mount of material to create stop 16 and retention feature 18.

The exemplary head 12 comprises an outer surface 20 and a contact surface 22 joined by a peripheral or edge surface 24. Furthermore, edge surface 24 of head 12 may have one or more flat surface sections 26 that help resist rotation of pivot structure 10 once pressed into one of the members to be joined, as discussed more fully below. As best illustrated in FIG. 2, one configuration of head 12 is a hexagonal configuration having six flat surface sections 26. However, head 12 may be formed in a variety of other shapes and configurations.

Body 14 has a first end 28 attached to head 12 and a second end 30 attached to retention feature 18. In the embodiment illustrated, body 14 is generally circular in cross-section (see FIG. 2) to promote pivotable movement of adjacent components. However, other cross-sectional shapes and configurations potentially can be used depending on design parameters and environment. Body 14 also may comprise a relief 32 formed generally adjacent contact surface 22 of head 12. Relief 32 is generally annular and provides space for material flow when head 12 is forced into a given material. Also, body 14 may comprise one or more axial openings 34 extending therethrough from stop 16 to head 12. In the embodiment illustrated, a single axial opening 34 extends through body 14 and head 12.

Stop 16 is designed to abuttingly engage a tool used in deforming retention feature 18. Accordingly, stop 16 comprises a stop surface 36 positioned to abuttingly engage the tool as it is moved towards head 12. In the illustrated embodiment, stop 16 is disposed radially inwardly from retention feature 18 and the external surface of body 14. However, depending on the application of pivot structure 10 and the design of a given deformation tool, stop 16 also can be located external to retention feature 18 and/or body 14.

In the embodiment illustrated, retention feature 18 is configured as an annular tab or lip 38 extending along part or all of the perimeter of second end 30 of body 14. Retention feature 18 is deformed generally towards head 12 to establish a predetermined pivot spacing, represented by arrow 40. Stop 16 limits the deformation of retention feature 18, such that a predetermined, repeatable pivot spacing 40 may be achieved.

Figure 3:
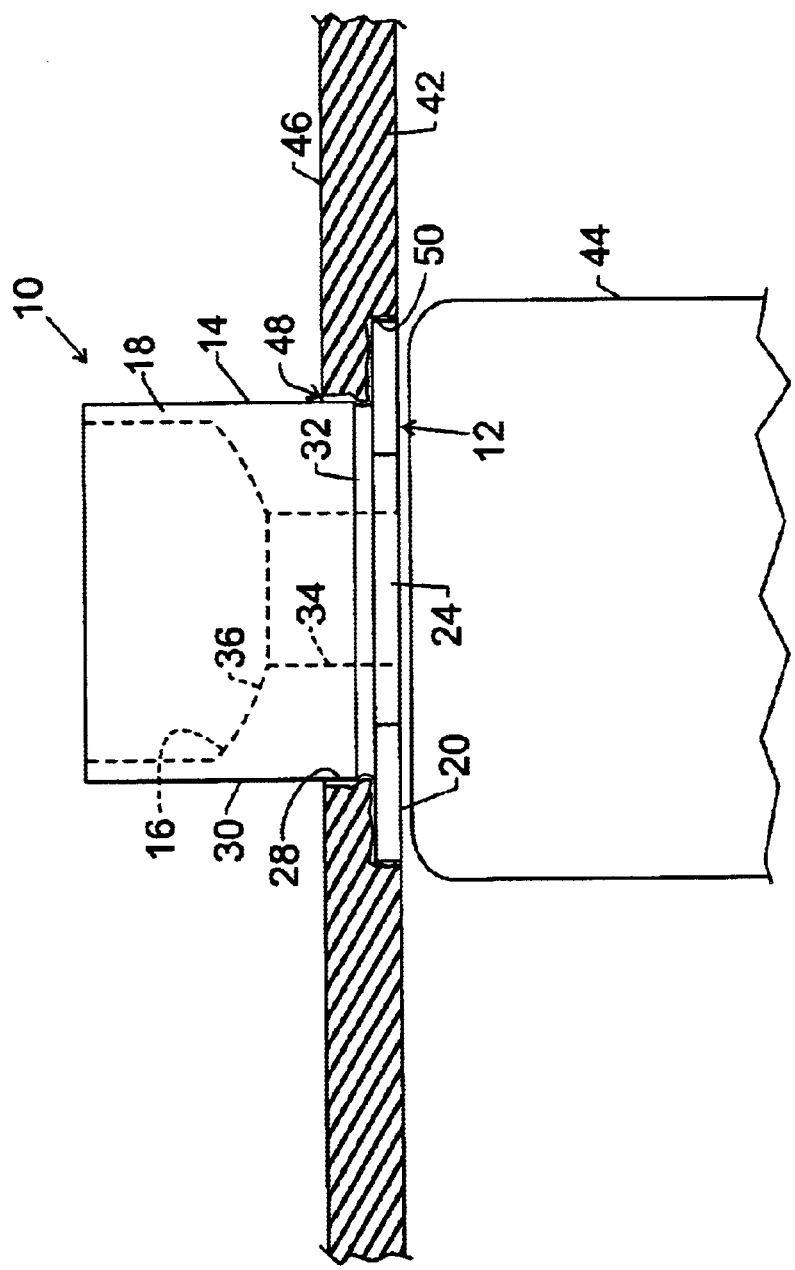
FIG. 3 illustrates deployment of the pivot structure in a desired member.
Figure 4:
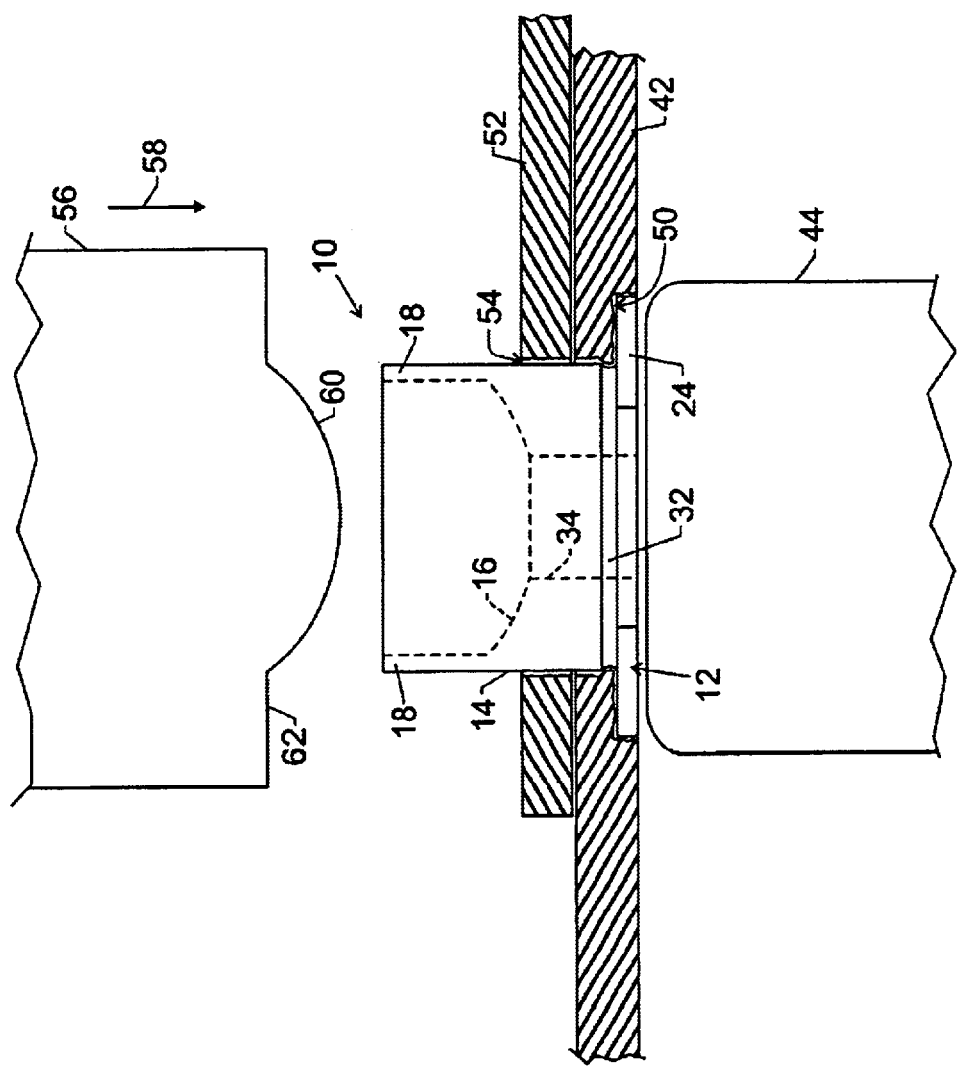
FIG. 4 illustrates placement of a tool prior to deformation of the pivot structure.

As illustrated best in FIG. 3, during creation of a pivot, pivot structure 10 is pressed through a first member 42 by, for instance, an appropriate tool 44. An exemplary tool 44 is of the type utilized in pressing standoffs into a variety of sheet materials used in the construction of computer and computer component chassis. However, a variety of tools 44 can be used to press pivot structure 10 into a desired material, as would be understood by one of ordinary skill in the art.

In this embodiment, first member 42 comprises a generally planar portion 46 having an opening 48 therethrough. An exemplary material is a deformable material, such as a sheet metal. However, a variety of plastics and other materials may be appropriate in some applications.

Body 14 is inserted through opening 48 until contact surface 22 of head 12 contacts first member 42. Then, a sufficient force is applied to head 12 to press head 12 into the material of first member 42, thereby creating a plastically deformed region 50. Head 12 is securely held within plastically deformed region 50. Relief 32 provides space for the flow of plastically deformed material as region 50 is created. In an exemplary application, head 12 is pressed into first member 42 until outer surface 20 is generally flush with the corresponding surface of first member 42.

Simultaneously or subsequent to connection of head 12 with first member 42, a second member 52 is disposed about body 14 via an appropriate opening 54. Opening 54 is sized to permit pivotable motion of second member 52 with respect to first member 42. Once second member 52 and first member 42 are positioned on pivot structure 10, an appropriate deformation tool 56 is moved against retention feature 18, as indicated by arrow 58.

Figure 5:
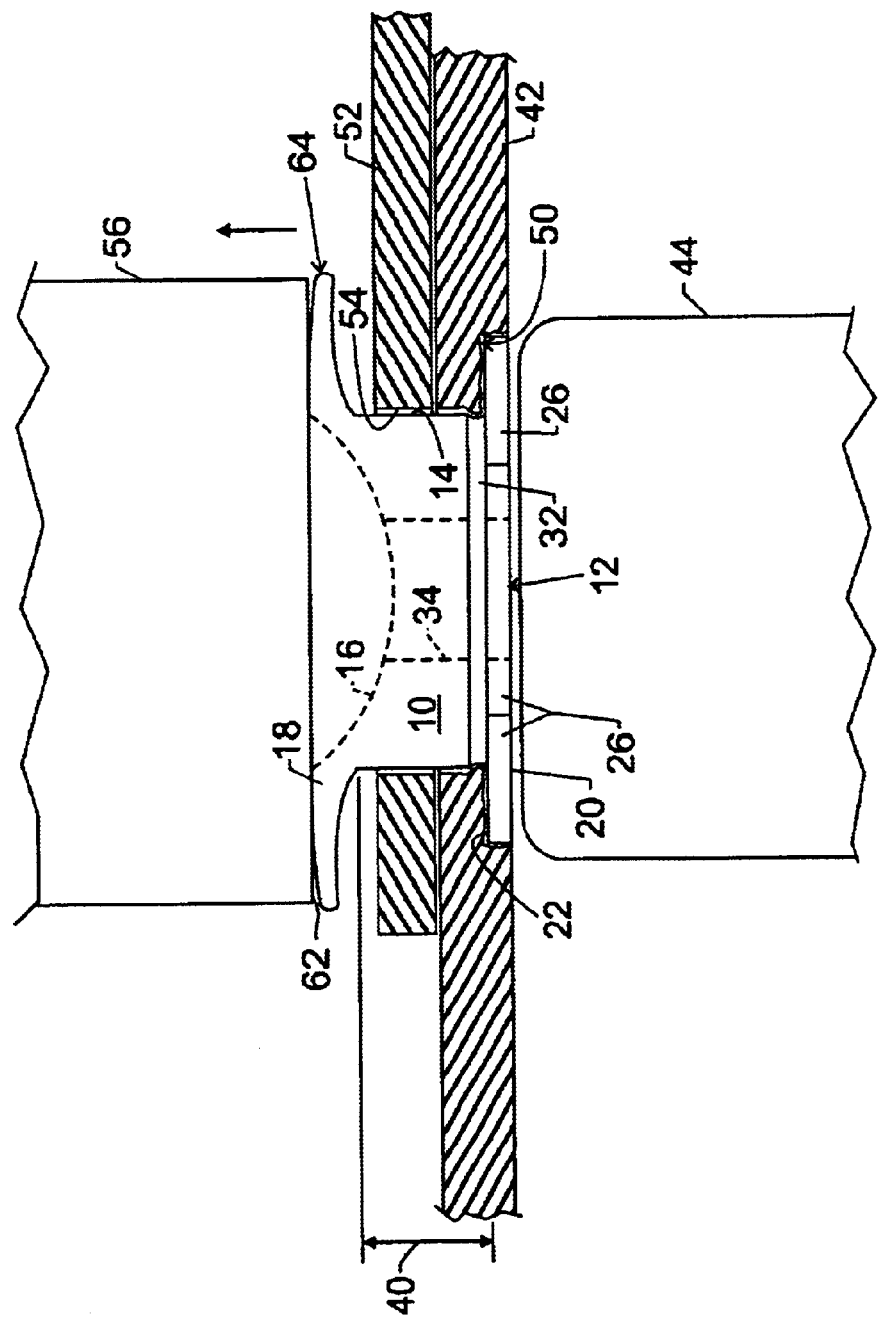
FIG. 5 illustrates deformation of the pivot structure to a desired degree.

Deformation tool 56 may have a variety of profiles depending on the size and configuration of pivot structure 10. However, an exemplary profile comprises a stop contact region 60 designed to abut stop 16 and a flared region 62 designed to flare retention feature 18 in a radially outward direction, as best illustrated in FIG. 5.

As deformation tool 56 is moved towards head 12, retention feature 18 is deformed, e.g. bent, in a radially outward direction to a plastically deformed state 64. The amount of plastic deformation is limited by abutting engagement between stop contact region 60 of deformation tool 56 and stop 16 of pivot structure 10. Thus, a precisely controllable pivot spacing 40 is achieved. This controllable spacing 40 permits selection of an unobstructed pivotable motion of first member 42 relative to second member 52 or selection of a tighter fit that provides a desired degree of friction between components.

Figure 6:
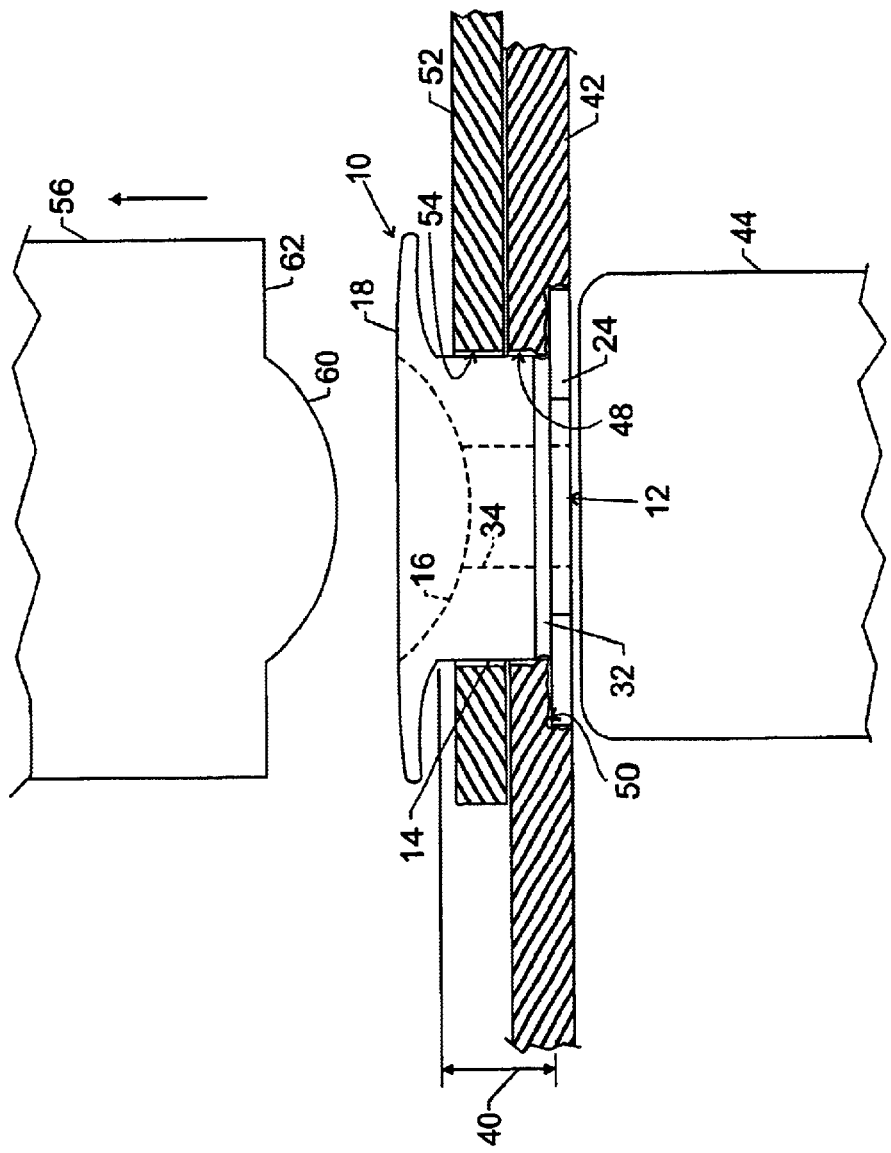
FIG. 6 illustrates withdrawal of the tool following the desired deformation.

Subsequent to deformation of retention feature 18, deformation tool 56 is withdrawn, as illustrated best in FIG. 6.

The assembled system comprises pivotably joined components that have the desired degree of freedom of motion or the desired degree of friction therebetween. The unique design of pivot structure 10 permits such control over pivot spacing in a system that can be rapidly and repeatedly applied in, for example, a manufacturing process that produces large volumes of pivotably connected components.

It also should be noted that although the deformation of first member 42 by head 12 and the deformation of retention feature 18 have been described sequentially, those deformations can be accomplished simultaneously. In other words, first member 42 and second member 52 can be disposed about body 14 with subsequent deformation of both first member 42 and retention feature 18. Additionally, head 12 may be pressed into either first member 42 or second member 52 to create plastically deformed region 50.

First member 42 and second member 52 are representative of components utilized in a variety of machines and devices. For example, first member 42 may be part of a computer chassis or computer component chassis, and second member 52 may comprise a pivotably mounted lever or other adjacent chassis portion. Also, first member 42 and second member 52 may comprise portions of hinges utilized in various machines and devices. Additionally, first member 42 and second member 52 may be formed as sheet materials or a variety of other component types that are pivotably connected. These are just a few examples of implementations of the overall pivot system.

It will be understood that the foregoing description is of exemplary embodiments of this invention, and that the invention is not limited to the specific forms shown. For example, the pivot structure may have a variety of configurations and sizes; various materials may be utilized in the formation of the pivotably coupled components as well as the pivot structure; and various tool types and configurations can be utilized in accomplishing the desired plastic deformation. These and other modifications may be made in the design and arrangement of the elements without departing from the scope of the invention as expressed in the appended claims.

What is claimed is:

1. A system for forming a pivot, comprising:
   a first member;
   a second member; and
   a pivot structure having a head disposed at one end of the pivot structure, a body connected to the head, a stop and a lip disposed at a generally opposite end of the body from the head, the body extending through the first member and the second member, the first member having a plastically deformed region receiving the head to form a substantially flat surface with the first member, the lip being deformed generally towards the stop to prevent separation of the second member from the first member while enabling relative pivotal motion between the first and the second member.

2. The system as recited in claim 1, wherein the body has a generally circular cross-section.

3. The system as recited in claim 2, wherein the lip encircles the stop.

4. The system as recited in claim 1, wherein the body comprises a relief cut proximate the head to receive material from the first member during formation of the plastically deformed region.

5. The system as recited in claim 2, wherein the head has a plurality of flat sides.

6. The system as recited in claim 5, wherein the flat sides are arranged in a hexagon.

7. The system as recited in claim 1, wherein the first member is formed from a metal sheet material.

8. The system as recited in claim 7, wherein the metal sheet material is a portion of a computer chassis.

9. A method of creating a pivot, comprising:

placing a pivot structure with a head, a body, a stop and a retention feature proximate a first member;

moving the body through the first member until the head plastically deforms the first member;

pivotably mounting a second member to a portion of the body extending through the first member; and deforming the retention feature with a tool until the tool strikes the stop.

10. The method as recited in claim 9, wherein moving comprises moving the body through an opening formed in the first member.

11. The method as recited in claim 9, wherein deforming comprises bending the retention feature.

12. The method as recited in claim 9, wherein deforming comprises bending a generally circular retention feature surrounding the stop.

13. The method as recited in claim 9, further comprising selecting a gap between the head and the deformed retention feature by selecting a desired distance between the head and the stop.

14. The method as recited in claim 9, wherein moving comprises moving the body through a sheet metal portion of the first member.

15. The method as recited in claim 14, further comprising forming a hole through the sheet metal portion sufficiently large to permit unobstructed passage of the body while obstructing passage of the head.

16. A device to pivotally secure a first member to a second member, comprising:

a body;

a head disposed at one end of the body the head adapted to be secured to the first member, wherein the head comprises a plurality of flat sides to better secure the head to the first member during plastic deformation of the first member;

a deformable retention member disposed at a generally opposite end of the body from the head, wherein the deformable retention member comprises a generally circular lip; and a stop positioned a predetermined distance from the head to permit control of the deformation of the deformable retention member, wherein the stop is disposed within the generally circular lip.

17. The device as recited in claim 16, wherein the body comprises a relief region proximate the head.

18. The device as recited in claim 16, wherein the deformable retention member is sized to extend through the second member.

19. The device as recited in claim 16, wherein the stop is disposed such that the deformable retention member does not deform to prevent movement of the first member relative to the second member.

* * * * *